(12) United States Patent
Boland

(10) Patent No.: US 11,479,212 B2
(45) Date of Patent: Oct. 25, 2022

(54) WINDSCREEN WIPER DEVICE OF THE FLAT BLADE TYPE

(71) Applicant: TRICO BELGIUM SA, Aubange (BE)

(72) Inventor: Xavier Boland, Arlon (BE)

(73) Assignee: TRICO BELGIUM SA, Aubange (BE)

( * ) Notice: Subject to any disclaimer, the term of this patent is extended or adjusted under 35 U.S.C. 154(b) by 0 days.

(21) Appl. No.: 17/272,532

(22) PCT Filed: Aug. 27, 2018

(86) PCT No.: PCT/EP2018/072976
§ 371 (c)(1),
(2) Date: Mar. 1, 2021

(87) PCT Pub. No.: WO2020/043264
PCT Pub. Date: Mar. 5, 2020

(65) Prior Publication Data
US 2021/0323508 A1   Oct. 21, 2021

(51) Int. Cl.
*B60S 1/52* (2006.01)
*B60S 1/40* (2006.01)
*B60S 1/34* (2006.01)
*B60S 1/38* (2006.01)

(52) U.S. Cl.
CPC ............. *B60S 1/522* (2013.01); *B60S 1/3429* (2013.01); *B60S 1/4083* (2013.01); *B60S 1/4087* (2013.01); *B60S 1/3868* (2013.01)

(58) Field of Classification Search
CPC .... B60S 1/3849; B60S 1/3862; B60S 1/3429; B60S 1/4083; B60S 1/4087; B60S 1/522; B60S 1/524; B60S 1/3415; B60S 2001/409; B60S 1/3868

USPC ......................................... 15/250.32, 250.04
See application file for complete search history.

(56) References Cited

U.S. PATENT DOCUMENTS

| | | | |
|---|---|---|---|
| 6,718,594 B1 * | 4/2004 | Kotlarski | B60S 1/38 |
| | | | 15/250.32 |
| 9,260,085 B2 * | 2/2016 | Bex | B60S 1/40 |
| 2010/0017994 A1 * | 1/2010 | Boland | B60S 1/4087 |
| | | | 15/250.3 |

(Continued)

FOREIGN PATENT DOCUMENTS

| | | |
|---|---|---|
| DE | 102015224631 | 6/2017 |
| EP | 1099609 * | 5/2001 |

*Primary Examiner* — Gary K. Graham
(74) *Attorney, Agent, or Firm* — Bryan Cave Leighton Paisner LLP

(57) ABSTRACT

A windscreen wiper device of the flat blade type having an elastic, elongated carrier element and an elongated wiper blade of a flexible material, adapted to be placed in abutment with a windscreen to be wiped. The wiper blade includes at least one longitudinal slit, in which at least one longitudinal strip of the carrier element is disposed. The windscreen wiper device comprises an oscillating arm having a rod-like extension, a connecting device and a nozzle for spraying a washing liquid onto the windscreen to be wiped. The connecting device includes a channel adapted to receive a free end of the rod-like extension. The nozzle is adapted to be mounted onto the rod-like extension. The nozzle and the connecting device are provided with mutually cooperating protrusion/groove means for locking the nozzle onto the connecting device upon insertion of the free end of the rod-like extension inside the channel of the connecting device.

19 Claims, 10 Drawing Sheets

(56) References Cited

U.S. PATENT DOCUMENTS

2015/0217729 A1* 8/2015 Friscioni .............. B60S 1/4087
15/250.32
2017/0232938 A1 8/2017 Picot et al.
2021/0001817 A1* 1/2021 Bratec .................... B60S 1/522

* cited by examiner

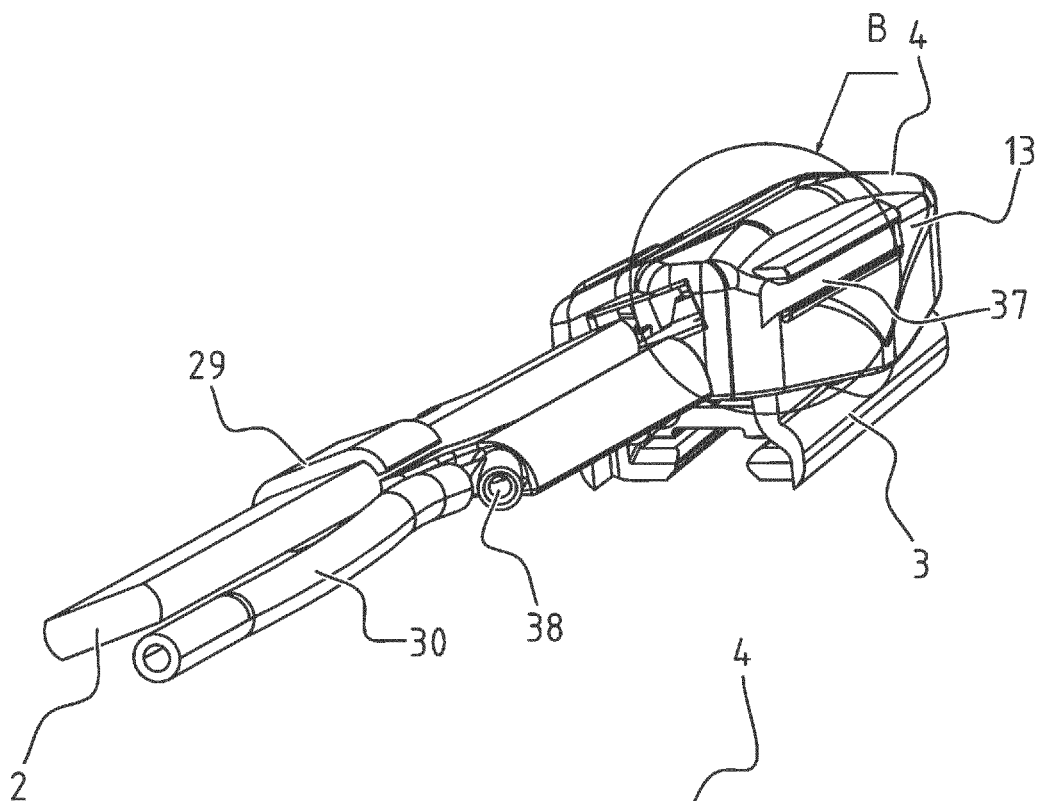
FIG. 8
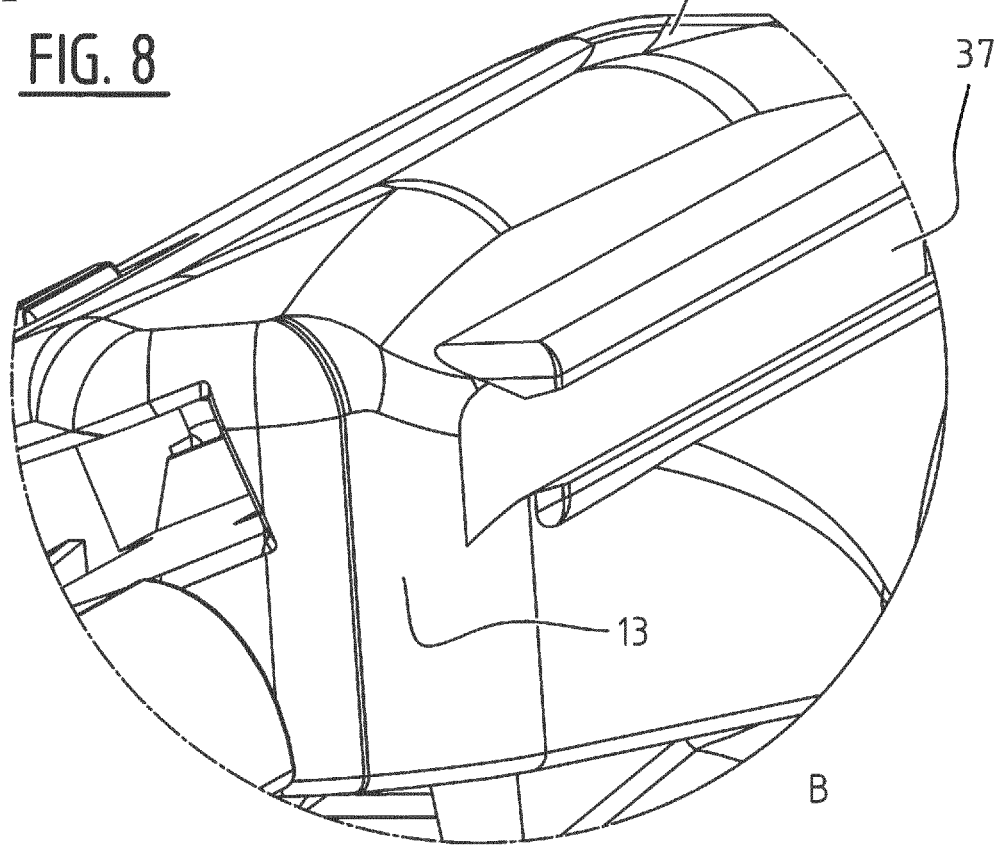

WINDSCREEN WIPER DEVICE OF THE FLAT BLADE TYPE

BACKGROUND OF THE INVENTION

A windscreen wiper device, designed as a so-called "flat blade" or "yokeless blade" where no use is made of several yokes pivotally connected to each other, is generally known. The wiper blade is biased by a carrier element, as a result of which it exhibits a specific curvature. A disadvantage of this windscreen wiper device is that it is often used in combination with a nozzle fixedly mounted on (or below) a bonnet of a car for spraying a washing liquid onto the car's windscreen to be wiped. In practice it has become apparent that the windscreen cannot effectively be cleaned by a combination of the oscillating arm and the nozzle, as the nozzle emits the washing fluid at a large distance relative to the windscreen, so that a relatively large amount of the washing fluid does not effectively reach a wiping pattern on the windscreen to be wiped. Further, it has become apparent that in the prior art, a large amount of liquid (consumption) is required in an attempt to clean the windscreen to be wiped. Further, if the washing fluid is spread onto the car's body instead of onto the windscreen to be wiped, it may damage the car. Indeed, ethanol, methanol and other components of the washing fluid are believed to have a corrosive effect on paint, rubber, car wax and plastics, for example.

SUMMARY OF THE INVENTION

It is an object of the invention to provide an improved windscreen wiper device which obviates the disadvantages discussed above. At minimum costs—without using complex machinery and additional tools—a simple oscillating arm (also called "windscreen wiper arm") is proposed to effectively clean a windscreen to be wiped, without damaging parts of a car, where less washing liquid is required to clean the windscreen to be wiped.

The present invention relates to a windscreen wiper device of the flat blade type comprising an elastic, elongated carrier element, as well as an elongated wiper blade of a flexible material, which can be placed in abutment with a windscreen to be wiped. The wiper blade includes at least one longitudinal slit, in which at least one longitudinal strip of the carrier element is disposed. The windscreen wiper device comprises a connecting device for a rod-like extension of an oscillating arm. The rod-like extension can be pivotally connected to the connecting device about a pivot axis near one end thereof. The longitudinal strip is also called a "flexor," and the connecting device is also called a "connector." The slit may be open or closed.

Preferably, the wiper blade comprises a spoiler at a side facing away from the windscreen to be wiped. The spoiler is also called an "air deflector" and is preferably made in one piece with the wiper blade through extrusion. The longitudinal slit is preferably a central longitudinal slit accommodating the longitudinal strip. The connecting device is preferably fixedly connected to the longitudinal strip(s) particularly through a welding, brazing ("soldering"), gluing or clamping operation or with the help of a pin inserted through the connecting device and the longitudinal strip(s). In the alternative or in addition thereto, the connecting device is clamped onto the flexible material of the wiper blade, particularly in case the latter is equipped with a central longitudinal slit for the carrier element.

In use, the oscillating arm is connected to a mounting head mounted on a drive shaft. One end of the oscillating arm is pivotally connected to the mounting head by means of a pivot pin. The other end of the arm is connected to the wiper blade placed in abutment with the windscreen to be wiped. In use, the shaft rotates alternately in a clockwise and in a counter-clockwise sense carrying the mounting head into rotation also, which in turn draws the oscillating arm into rotation and, by means of the connecting device, moves the wiper blade. The oscillating arm can thus oscillate to-and-from between a first and second reversal positions.

The present invention also relates to a connecting device, as well as an oscillating arm with a rod-like extension arranged for use in such a windscreen wiper device.

It is noted that the present invention is not restricted to automobiles, but also refers to rail coaches and other (fast) vehicles.

According to the invention, the connecting device comprises a channel arranged to receive the rod-like extension. The windscreen wiper device comprises a nozzle for spraying a washing liquid onto the windscreen to be wiped. The nozzle is mounted, preferably detachably, onto the rod-like extension. The nozzle and the connecting device are provided with mutually cooperating protrusion/groove means for locking the nozzle onto the connecting device upon insertion of the free end of the rod-like extension inside the channel of the connecting device. In other words, in a first preferred embodiment the nozzle comprises a protrusion cooperating with a groove in the connecting device. In a second preferred embodiment, the nozzle comprises a groove cooperating with a protrusion on the connecting device. The gist of the present invention is that, upon sliding the free end of the rod-like extension inside the channel by hand, the nozzle is mounted in one go (i.e. in one linear movement) onto the connecting device. In the first preferred embodiment, the protrusion on the nozzle slides inside the groove in the connecting device. In the second preferred embodiment, the protrusion on the connecting device slides inside the groove in the nozzle. Hence, an operator fitting the wiper blade onto the rod-like extension of the oscillating arm, simultaneously fits the nozzle onto the connecting device. Thus, no special tools or parts, such as a special wiper blade and/or a special connecting device for the nozzle, are necessary, saving materials and costs. A mechanical fixation of the nozzle on the connecting device is thus obtained by a (preferably linear) groove and (preferably linear) protrusion.

By connecting the nozzle directly to the rod-like extension of the oscillating arm, the nozzle is not only fixed to the rod-like extension in a reliable and controllable manner, although detachably in case of repair or replacement of the nozzle, but the nozzle is located at a very small distance relative to the windscreen to be wiped and is allowed to directly follow any oscillatory movement of the oscillating arm, so that the washing fluid exiting the nozzle can be effectively sprayed thereon, with all positive consequences involved as to effective cleaning of the windscreen to be wiped and safe visibility for a driver. The mutually cooperating protrusion/groove means ensures that any movement of the nozzle in a transversal direction (i.e. in a direction towards the windscreen to be wiped and in a direction away from the windscreen to be wiped, i.e. perpendicular to the windscreen to be wiped) is blocked. Locking means for locking the rod-like extension inside the channel in the longitudinal direction ensures that any movement of the nozzle is blocked in the longitudinal direction as well.

Further, the nozzle may be used as a first nozzle in combination with a second nozzle located on the oscillating arm for spraying a washing liquid onto the windscreen to be wiped. Hence, in that case the washing liquid is sprayed from at least two locations (on the rod-like extension and on the oscillating arm) onto the windscreen to be wiped. In particular washing liquid exits from the first nozzle connected to the rod-like extension, and washing liquid exits from the second nozzle connected to the oscillating arm. Thus, the windscreen can be cleaned efficiently over a very large wiping area thereof, particularly at high speeds. In that case, the first and second nozzles are preferably connected to only one inlet for the washing fluid, so that the first and second nozzles are in liquid contact with each other.

In a preferred embodiment of a windscreen wiper device in accordance with the invention, the nozzle extends parallel to the rod-like extension. The nozzle is locked onto the connecting device upon insertion of the free end of the rod-like extension, in the longitudinal direction of the rod-like extension, inside the channel of the connecting device. Preferably, a linear sliding movement in the longitudinal direction of the rod-like extension inside the channel causes the protrusion on the nozzle to slide inside the groove in the connecting device (in the first preferred embodiment) or causes the protrusion on the connecting device to slide inside the groove in the nozzle (in the second preferred embodiment).

In another preferred embodiment of a windscreen wiper device according to the invention, the connecting device comprises a first part and a second part. The rod-like extension of the oscillating arm can be pivotally connected to the first part about the pivot axis, with the interposition of the second part. The second part comprises the channel. The first part is connected to the wiper blade and the second part is detachably connected to the first part. The nozzle and the second part are provided with mutually cooperating protrusion/groove means for locking the nozzle onto the second part upon insertion of the free end of the rod-like extension inside the channel of the connecting device.

In another preferred embodiment of a windscreen wiper device in accordance with the invention, the second part comprises the groove, and the nozzle comprises the protrusion. The protrusion is slid inside the groove upon insertion of the free end of the rod-like extension inside the channel of the connecting device.

In another preferred embodiment of a windscreen wiper device according to the invention, the groove and the protrusion are elongated and extend parallel to the rod-like extension.

In another preferred embodiment of a windscreen wiper device in accordance with the invention, the protrusion extends from a side wall of the nozzle facing towards the rod-like extension. Preferably, the protrusion comprises, seen in cross-section, an enlarged head connected to a base via a restricted neck. The enlarged head faces towards the rod-like extension, and the base faces towards the nozzle.

In another preferred embodiment of a windscreen wiper device according to the invention, the channel includes a first chamber facing towards an entrance of the channel, and a second chamber facing away from the entrance. The first chamber has a larger width than the second chamber. The first chamber is arranged to receive a first part of the free end of the rod-like extension, and the second chamber is arranged to receive a second part of the free end of the rod-like extension. The first part of the rod-like extension has a larger width than the second part of the rod-like extension. In other words, the free end of the rod-like extension has a cut-out in order to form the two parts, where the first part is wider than the second part. The second part forms a longitudinally extending finger to be accommodated in the correspondingly shaped second chamber of the channel. The wider first part is to be accommodated in the correspondingly shaped first chamber of the channel. Due to the cut-out there is a larger guiding surface in the connecting device to guide the rod-like extension inside the channel in a reliable yet controlled manner. Preferably, the first and second chambers of the channel have a closed circumference to enhance retention of the rod-like extension therein.

In a preferred embodiment of a windscreen wiper device in accordance with the invention, the channel is arranged to receive two types of the rod-like extension, where the types mutually differ in width of the first and second parts thereof, respectively. In other words, the first part of the first type rod-like extension is wider than the first part of the second type rod-like extension, while the second part of the first type rod-like extension is wider than the second part of the second type rod-like extension. The channel is arranged to accommodate both types of rod-like extensions. In the alternative, if the connecting device comprises a first part and a second part, the second part acts as a joint part and differs for each type of rod-like extension. Hence, the first part is a universal part, whereas there are two types of second parts corresponding to the two types of rod-like extensions.

In a further preferred embodiment of a windscreen wiper device according to the invention, the connecting device comprises a sidewardly and inwardly extending protrusion arranged to engage into a first recess provided on a longitudinal exterior side of the rod-like extension. The connecting device also comprises a resilient tongue arranged to engage into a second recess provided on the longitudinal exterior side of the rod-like extension. The resilient tongue is hingeable along a hinge axis between an inward position retaining the wiper blade onto the rod-like extension and an outward position releasing the wiper blade from the rod-like extension. Particularly, the channel has a closed circumference. More in particular, the channel is formed by a blind hole having a closed circumference. The resilient tongue cooperating with the second recess on the one hand and the protrusion cooperating with the first recess on the other hand form first and second retention means, respectively, for retaining the wiper blade onto the oscillating arm. The first and second retention means can be used independently from one another, i.e. the first retention means can be used without the second retention means and the second retention means can be used without the first retention means.

Preferably, the channel has a length and a width, where a plane extending in a direction of the width of the channel and a plane extending through the longitudinal strip along a width thereof at the location of the connecting device enclose an angle $\alpha$, where preferably $15°<\alpha<60°$. In other words, in a transverse or cross-section of the windscreen wiper device, a center line of the cross-sectional plane of the channel encloses the angle $\alpha$ with a symmetry axis of the longitudinal groove. Because of the angle $\alpha$, less pressure by the oscillating arm on the wiper blade is necessary to maintain high velocity wiping performances.

In the framework of the present invention the oscillating arm is equipped with the rod-like extension preferably having a rectangular cross-section. The extension is to be inserted in the channel of the connecting device, and the extension has a twisted orientation relative to the oscillating arm preferably having a U-shaped cross-section. Such a twisted arm extension has proven to considerably improve air flow and considerably reduce the height of the windscreen wiper device, while its design is attractive from a commercial perspective. The channel preferably has a rectangular cross-section and has a possible twisted orientation corresponding to the twisted orientation of the arm extension in order to accommodate the arm extension during use. In other words, a bottom of the channel does not extend parallel to a windscreen to be wiped (when the oscillating arm in one of the reversal positions is in a central region of the windscreen to be wiped and disregarding any small curvature thereof in that region), but the bottom and the windscreen to be wiped enclose the angle α in that region.

It is noted that the present invention is not restricted to the use of only one longitudinal strip forming the elastic carrier element that is particularly located in a central longitudinal groove of the wiper blade. Instead, the carrier element may also comprise two longitudinal strips, where the strips are disposed in opposite longitudinal grooves of the wiper blade. The groove(s) may be closed at one outer end.

In a further preferred embodiment of a windscreen wiper device in accordance with the invention, the protrusion is dimensioned such that in a working position of the wiper blade pivoted relative to the rod-like extension, the protrusion engages into the first recess thus retaining the wiper blade onto the rod-like extension;

in a service position of the wiper blade pivoted relative to the rod-like extension, the protrusion disengages from the first recess thus releasing the wiper blade from the rod-like extension.

In a further preferred embodiment of a windscreen wiper device according to the invention, the first and second recesses have an open circumference and are spaced-apart in the longitudinal direction.

In a further preferred embodiment of a windscreen wiper device in accordance with the invention, the resilient tongue is hingeable from the inward position into the outward position by a push button. The push button forms a part of an outer wall of the connecting device. Particularly, the push button is located near a free end of the connecting device facing towards the rod-like extension.

In a further preferred embodiment of a windscreen wiper device according to the invention, the connecting device comprises a first part and a second part. The rod-like extension of the oscillating arm can be pivotally connected to the first part about the pivot axis, with the interposition of the second part, The second part comprises the channel. The first part is connected to the wiper blade and the second part is detachably connected to the first part. Preferably, the first and the second parts are each made in one piece of plastic material.

In a further preferred embodiment of a windscreen wiper device in accordance with the invention, the first part and the second part are provided with mutually cooperating pivot means for pivotally connecting the second part to the first part. Particularly, the second part is connected to the first part by pivotally engaging protuberances of the first part, at the location of the pivot axis, in recesses provided in the second part. More in particular, the second part is detachably connected to the first part through a snapping/clipping operation.

In a further preferred embodiment of a windscreen wiper device according to the invention, the first part comprises a flat base having legs integral therewith engaging around longitudinal sides of the wiper blade, at the location of the groove. Preferably, the first part comprises two opposite side walls extending in an upright direction from the base, where one of the side walls comprises the sidewardly and inwardly extending protrusion. More preferably, the pivotally engaging protuberances of the first part are provided outwardly on the opposite side walls, and the recesses are provided inwardly in opposite walls of the second part. The protuberances are particularly mutually spaced far apart, so as to reduce angular play and to reduce wear.

In a further preferred embodiment of a windscreen wiper device in accordance with the invention, the side walls of the first part are entirely located inside the second part in a working position of the wiper blade.

BRIEF DESCRIPTION OF THE DRAWINGS

The invention will now be explained in more detail with reference to figures illustrated in a drawing, wherein:

FIG. 8 (with detail B) shows a rear view of the windscreen wiper device of FIG. 7 with the wiper arm mounted to the connector.

DETAILED DESCRIPTION OF PREFERRED EMBODIMENTS

Figure 1:
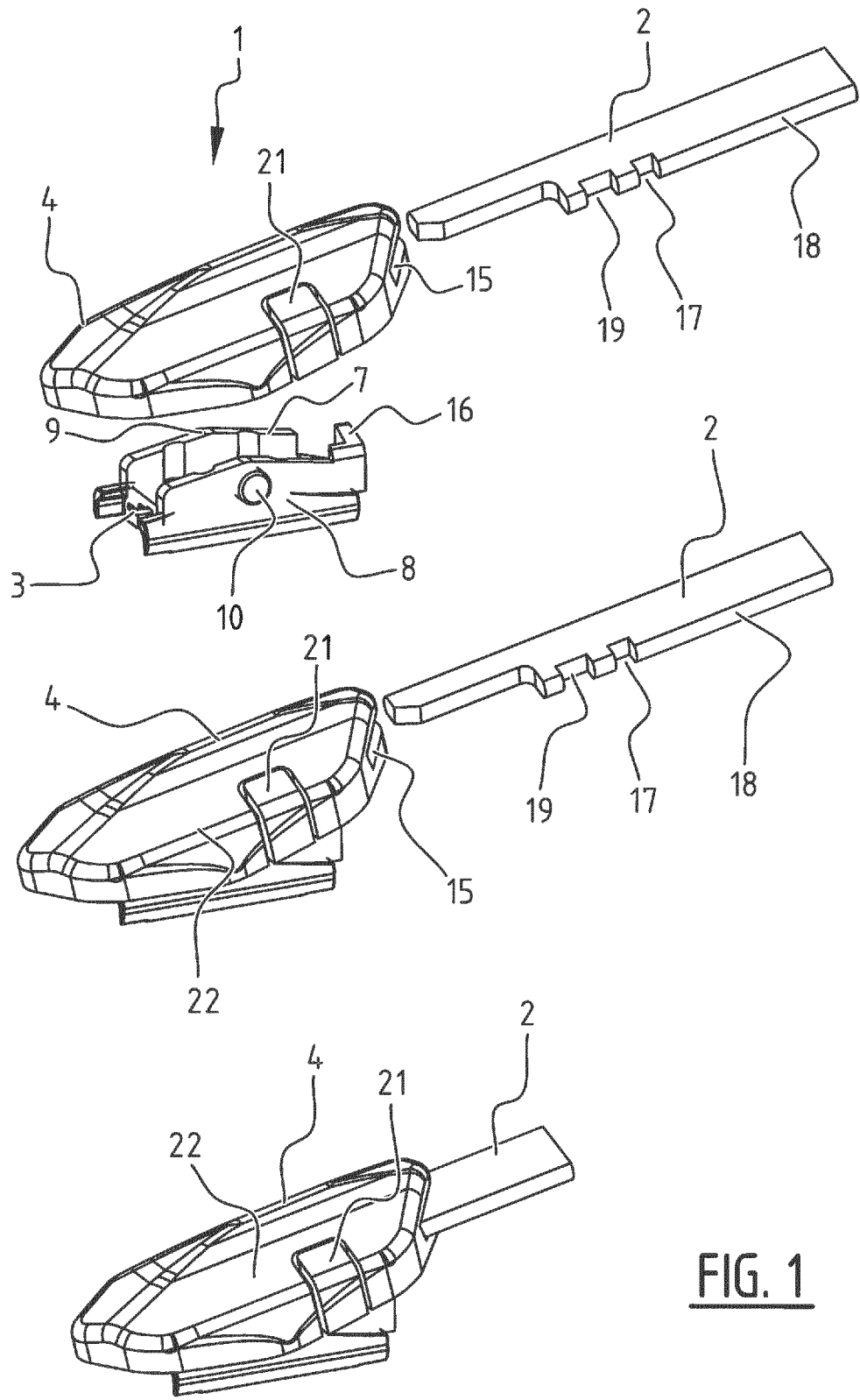
FIG. 1 shows in perspective view details of a windscreen wiper device of the flat blade type according to the invention, where successive steps are shown for fitting an oscillating arm ("windscreen wiper arm") to a connecting device ("connector") of a wiper blade.
Figure 2:
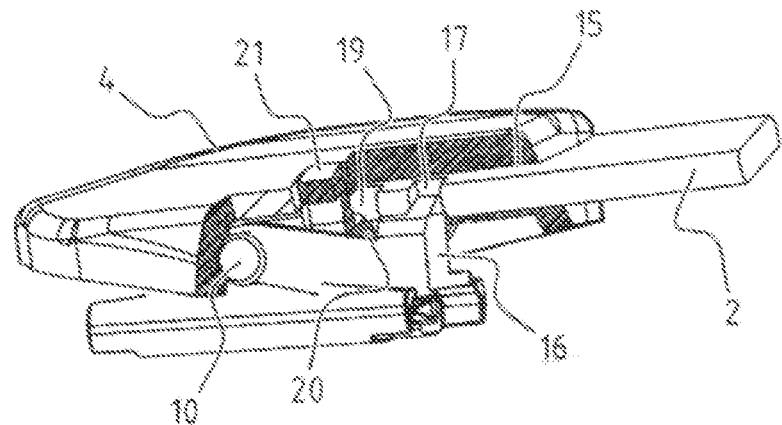
FIG. 2 shows in perspective view and partly in cross-section the windscreen wiper arm and the connector of FIG. 1 in an assembled position.
Figure 2:
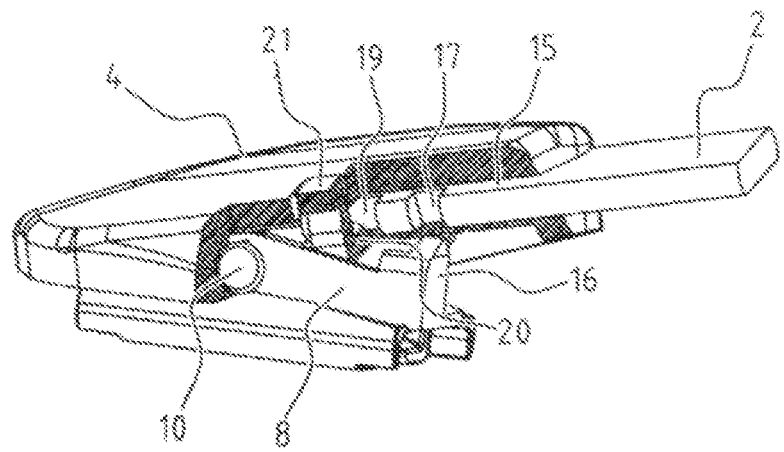
Figure 2:
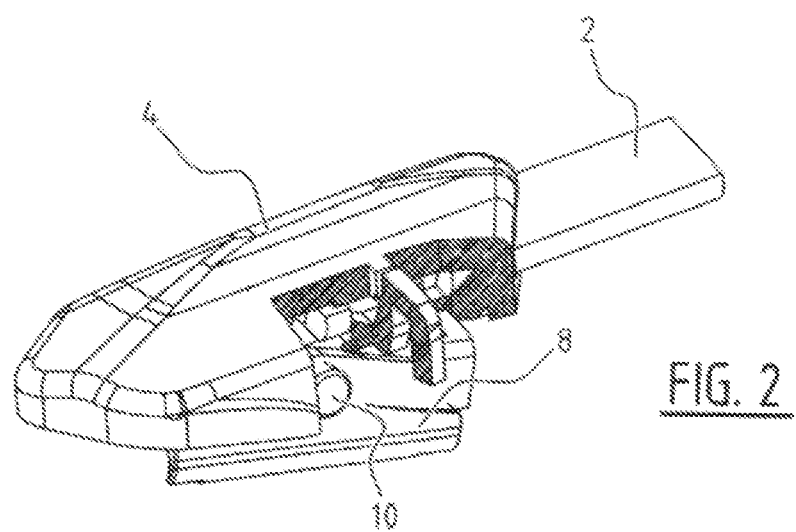
Figure 3:
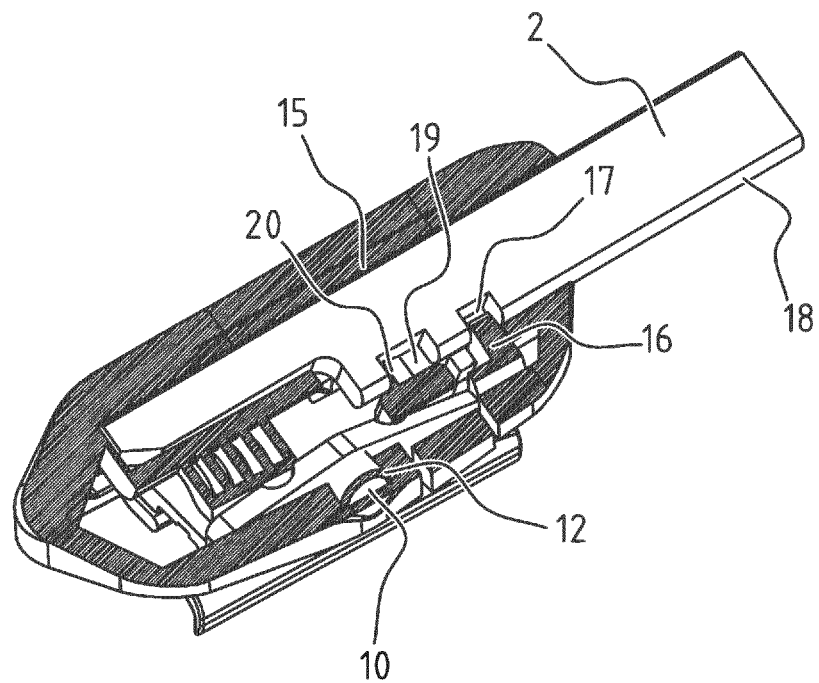
FIG. 3 shows details of the windscreen wiper arm of FIG. 2 in an upper view, partly in cross-section and partly cut open.
Figure 3:
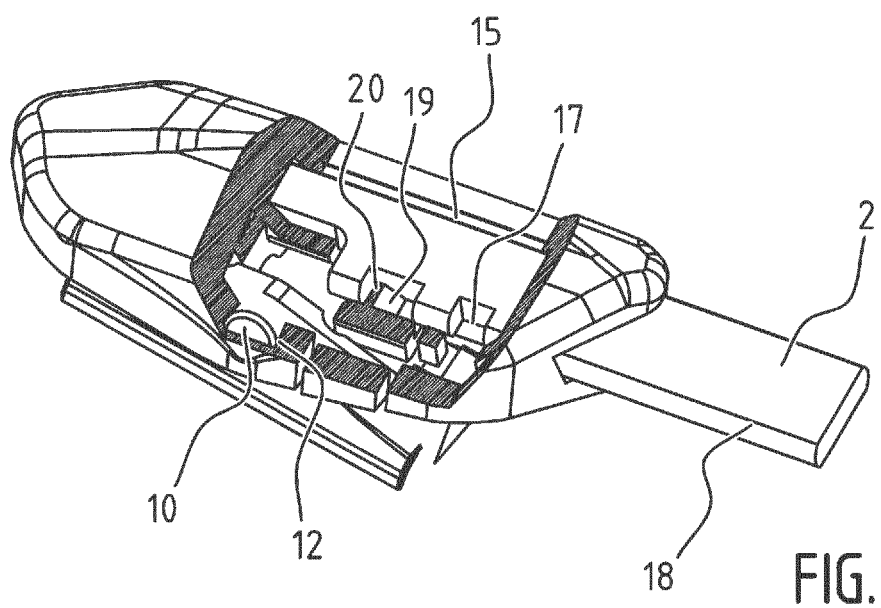
Figure 4:
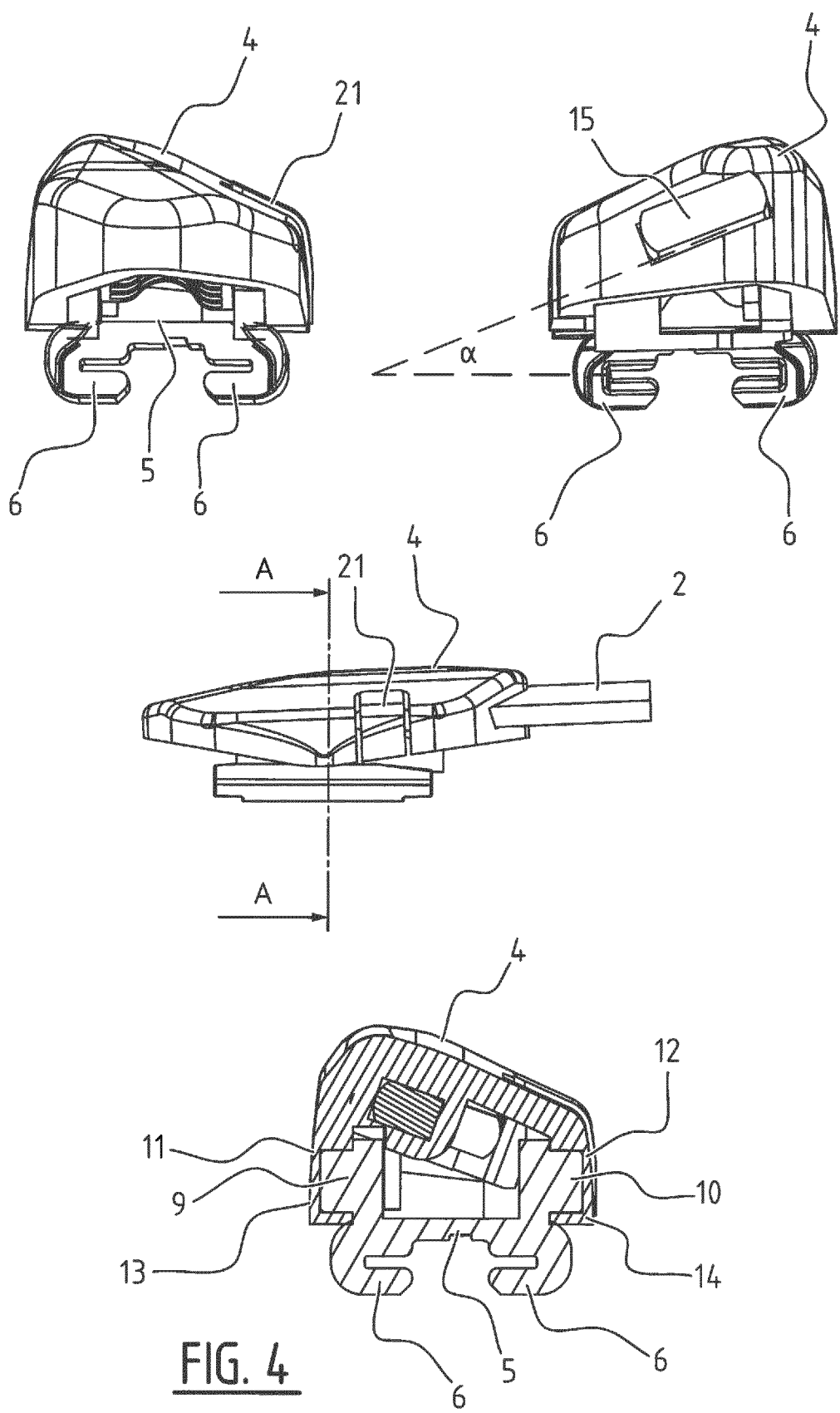
FIG. 4 shows details of the windscreen wiper arm of FIG. 2 in side views and in cross-section.

FIG. 1 illustrates a windscreen wiper device of the flat blade type that includes a wiper blade. Opposing longitudinal grooves are formed in the longitudinal sides of the wiper blade, and longitudinal strips ("flexors") made of spring band steel are fitted in the longitudinal grooves. The strips form a flexible carrier element for the rubber wiper blade, which is thus biased in a curved position (the curvature in operative position being that of a windscreen to be wiped). As shown in FIGS. 1, 2, 3 and 4, the windscreen wiper device also includes a connecting device 1, preferably formed from a plastic material, for a rod-like extension 2 of a windscreen wiper arm. The connecting device 1 comprises a first part 3 and a second part 4 acting as a joint part, where the rod-like extension 2 arm can be pivotally connected to the first part 3 about the pivot axis, with the interposition of the second part 4. The first part 3 comprises a flat base 5 having inwardly extending legs 6 integral therewith engaging around longitudinal sides of the wiper blade, at the location of the grooves, as a result of which the first part 3 is firmly attached to the unit consisting of the wiper blade and the strips. The first part 3 comprises two opposite side walls 7,8 extending in an upright direction from the flat base 5. On the opposite side walls 7,8 are formed cylindrical protuberances 9,10 extending outwardly. These protuberances 9,10 pivotally engage, at the location of the pivot axis, identically shaped recesses 11,12 provided in opposite walls 13,14 of the second part 4. Hence, the second part 4 is detachably connected to the first part 3 through a snapping/clipping operation. As shown in FIG. 2, the side walls 7,8 of the first part 3 are entirely located inside the second part 4 in a working position of the wiper blade.

With reference to FIGS. 1 through 6, the second part 4 comprises a channel 15 arranged to receive (in a linear movement) the rod-like extension 2 of the oscillating arm. As shown, the channel 15 has a length and a width. A plane extending in a direction of the width of the channel and a plane extending through the longitudinal strip along a width thereof at the location of the connecting device enclose an angle α=30°.

One of the side walls 8 of the first part 3 comprises a protrusion 16 extending sidewards and inwards, and is arranged to engage into a first recess 17 having an open circumference provided on a longitudinal exterior side 18 of the rod-like extension 19. For mounting or dismounting the connecting device 1 from the rod-like extension, the second part 4 (and thus the free end of the rod-like extension 2 connected thereto) is pivoted relative to the first part 3, as shown in FIGS. 1, 2 middle and bottom. As far as dismounting is concerned, while carrying out the pivot movement, the protrusion or cam 16 is no longer in line with the first recess 17, so that the second part 4 and the first part 3 attached thereto can be released from the rod-like extension 2 (see service position seen in FIG. 2 middle and bottom). As far as mounting is concerned, while carrying out the pivot movement, the protrusion or cam 16 becomes in line with the first recess 17, so that the second part 4 and the first part 3 attached thereto is retained onto the rod-like extension 2 (working position seen in FIG. 2 top). The mutually cooperating protrusion 16 and recess 17 act as second retention means in case the first retention means, as explained below, would inadvertently fail.

The rod-like extension 2 is also provided with a second recess 19 also having an open circumference and also provided on the same longitudinal exterior side 18 of the rod-like extension 2. As shown, the first and second recesses 17,19 have an open circumference and are spaced-apart in the longitudinal direction. The second recess 19 cooperates with a resilient tongue 20 on the second part 4 arranged to engage into the second recess 19, together acting as first retention means in this case. The resilient tongue 20 is hingeable along a hinge axis between an inward position retaining the second part 4 (together with the first part 3 and the wiper blade attached thereon) onto the rod-like extension 2 and an outward position releasing the second part 4 (together with the first part 3 and the wiper blade attached thereon) from the rod-like extension 2. The resilient tongue is hingeable (i.e. activated and deactivated) from the inward position into the outward position by a push button 21. The push button 21 forms a part of an outer wall 22 of the second part 4 and is located near a free end of the second part 4 facing towards the rod-like extension 2.

Figure 5:
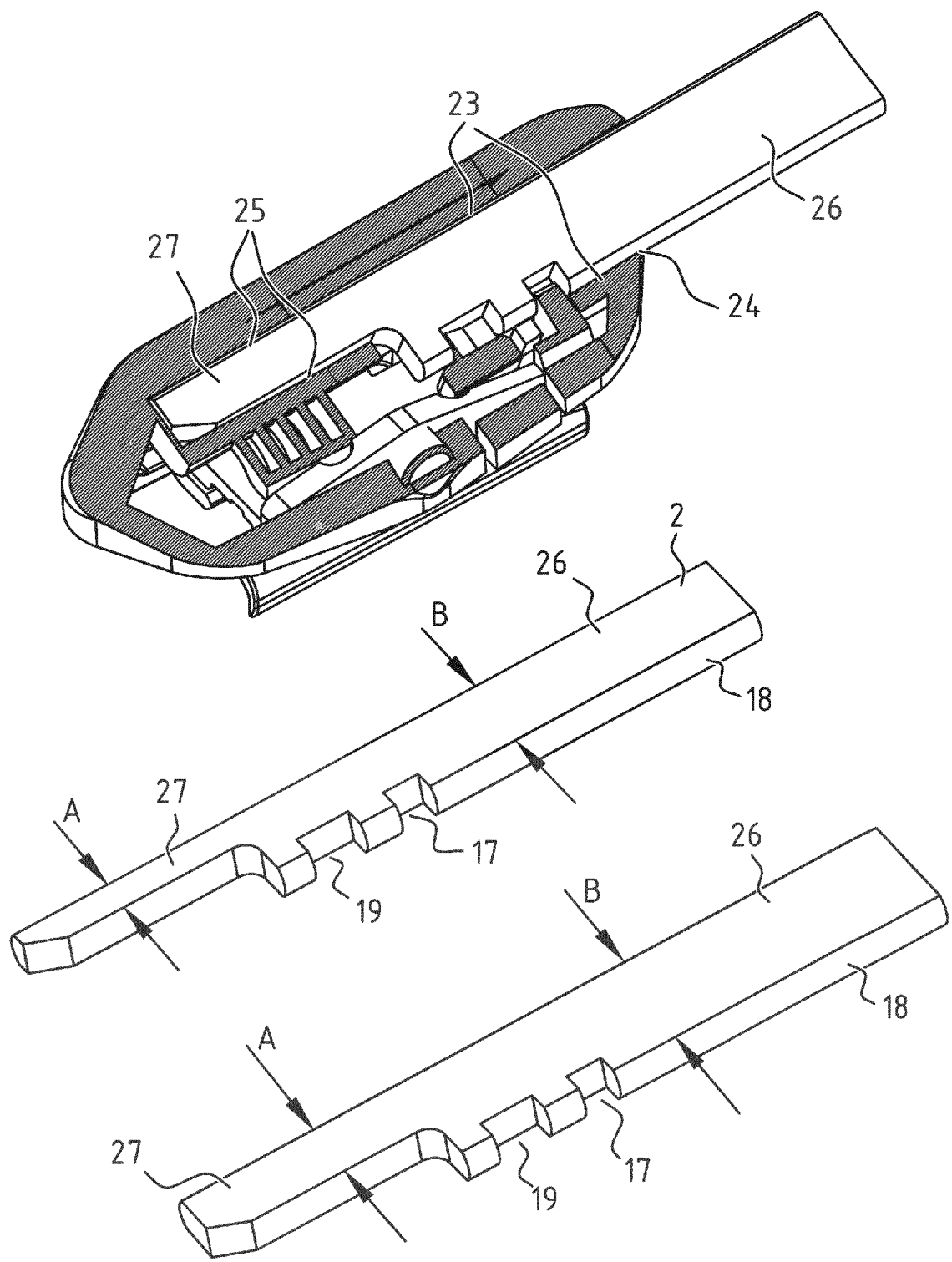
FIG. 5 on the top shows details of the windscreen wiper arm of FIG. 2 in an upper view, partly in cross-section, similar to FIG. 3 on the top, but designating other parts of the windscreen wiper arm, while FIG. 5 on the bottom shows in perspective view two types of rod-like extensions to be accommodated inside the connector.

As depicted in FIG. 5 on the top, the channel 15 comprises a first chamber 23 facing towards an entrance 24 of the channel 15, and a second chamber 25 facing away from the entrance 24. The first chamber 23 is wider than the second chamber 25. The first chamber 23 is arranged to receive a first part 26 of a free end of the rod-like extension 2, where the second chamber 25 is arranged to receive a second part 27 of the free end of the rod-like extension 2. The free end of the rod-like extension 2 has a cut-out in order to form the two parts 26,27 therein, where the first part 26 is wider than the second part 27. As indicated, the second part 27 forms a longitudinally extending finger, to be accommodated in the correspondingly shaped second chamber 25 of the channel 15. The wider first part 26 is to be accommodated in the correspondingly shaped first chamber 23 of the channel 15. The first part 26 of the rod-like extension 2 comprises the recesses 17,19 cooperating with the protrusion 16 and the resilient tongue 20 of the connecting device 1. As seen in FIG. 5 on the bottom, there are two types of rod-like extensions 2 to be accommodated in the chambers 23,25 of the channel 15: these types mutually differ in width A,B of the first and second parts 26,27 thereof.

Figure 6:
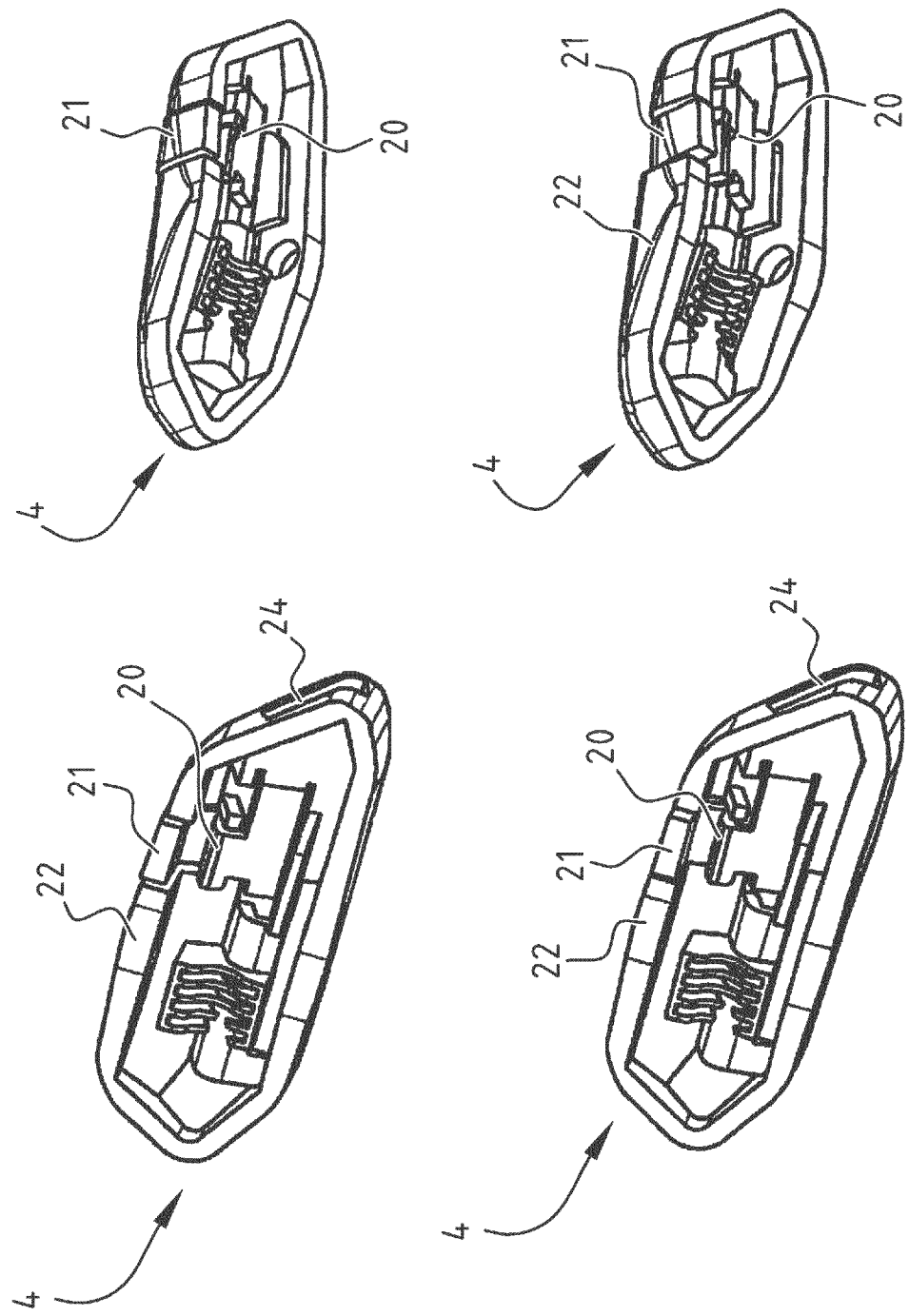
FIG. 6 shows various bottom views of the connector of FIG. 1.

FIG. 6 shows various bottom views of the second part 4 of the connecting device of FIG. 1 clearly showing how the resilient tongue 20 can be activated or deactivated with the help of the push button 21. By pushing in the push button 21, the resilient tongue 20 is removed from the recess 19, so that the wiper blade may be released from the rod-like extension 2.

Figure 7:
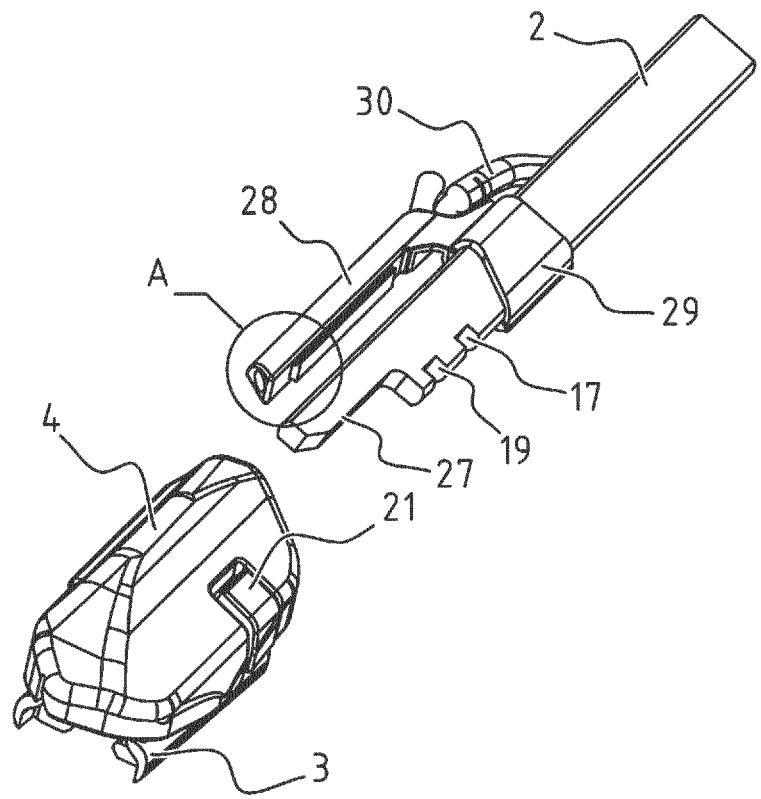
FIG. 7 (with detail A) shows the windscreen wiper device of FIG. 1, with a nozzle mounted on the oscillating arm.
Figure 7:
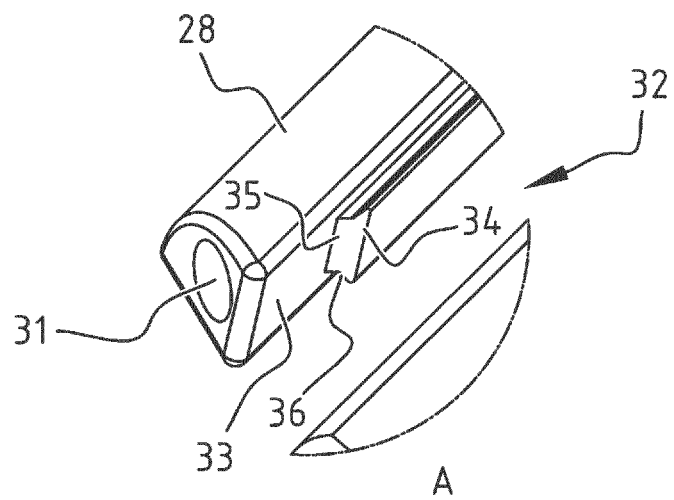
Figure 9:
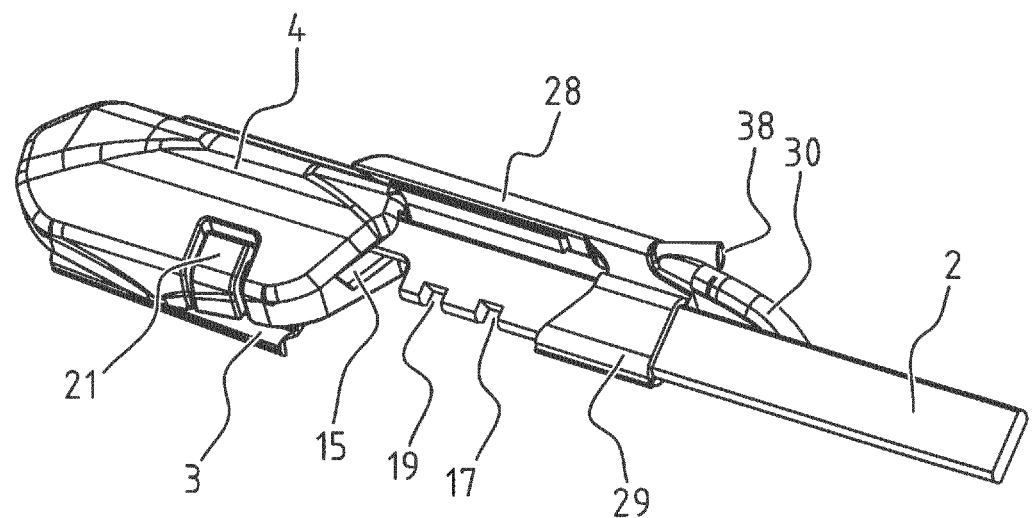
FIGS. 9 and 10 show successive steps for fitting the oscillating arm ("windscreen wiper arm") to the connector of the wiper blade together with fitting the nozzle onto the connector, all in one go.
Figure 9:
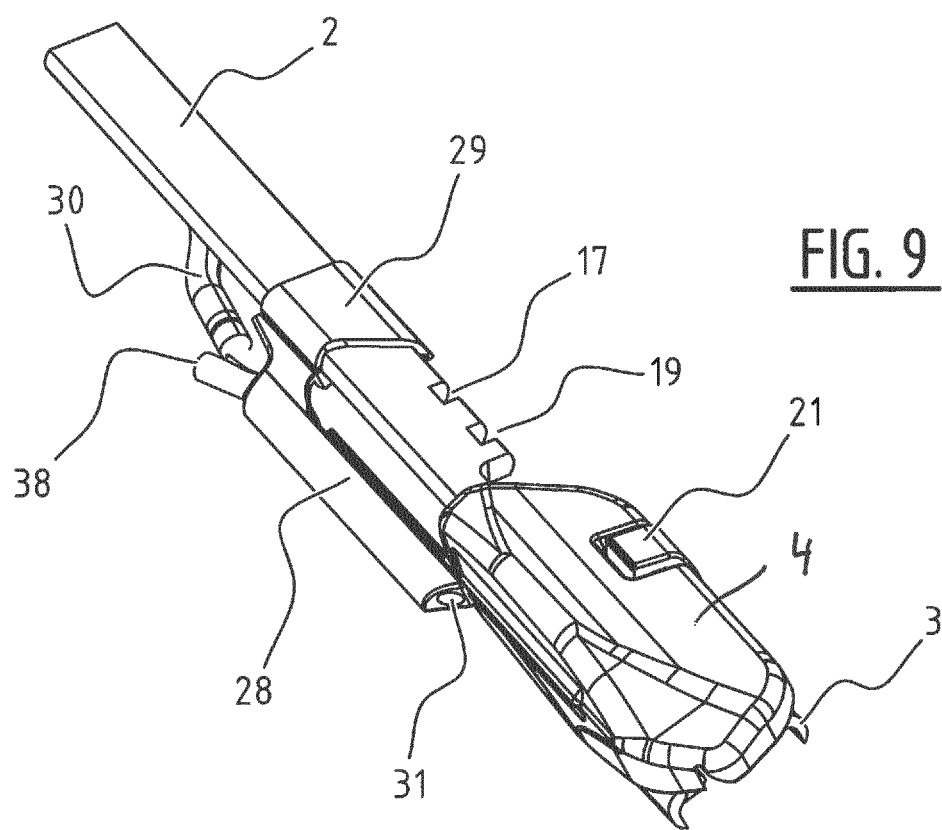
Figure 10:
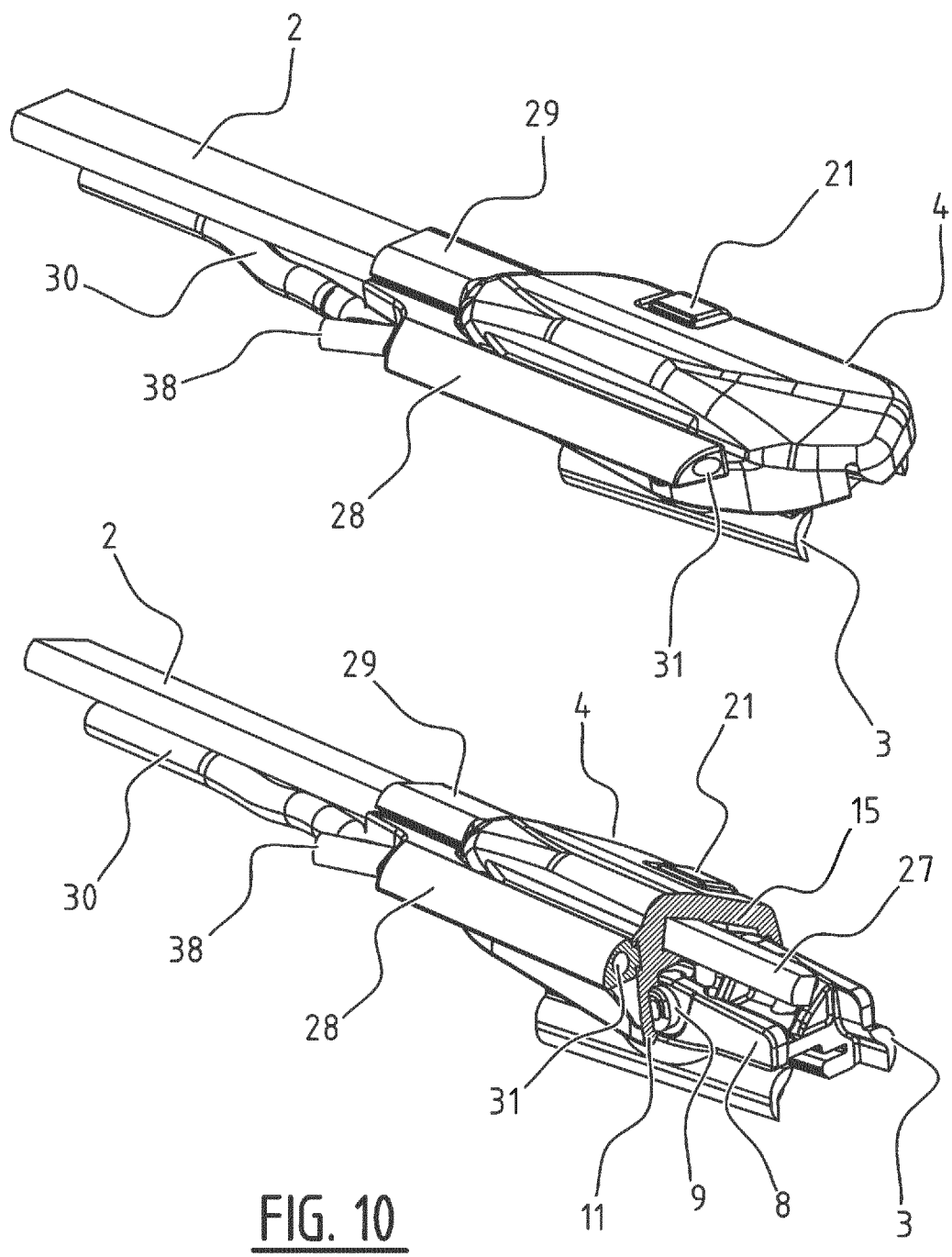

As shown in FIG. 7, an elongated nozzle 28 for spraying a washing liquid onto a windscreen to be wiped is clamped onto the rod-like extension 2, where use is made of a clip 29 clamped around the rod-like extension 2. The nozzle 28 is connected to a washing liquid pipe 30 for transporting washing liquid from a source (not shown) via the pipe 30 to the nozzle 28, so that washing liquid may exit the nozzle 28 via the outlet 31. The nozzle 28 extends parallel to the rod-like extension 2, as seen in FIGS. 7, 9 and 10. Particularly, the outlet 31 acts as an outlet for washing liquid in the forward direction to form a so called "front spray." In that case outlet 38 acts as an outlet for washing liquid in backward direction ("rear spray").

With reference to FIG. 7 and particularly the detail A shown therein, the nozzle 28 comprises a rib-like protrusion 32 extending from a side wall 33 of the nozzle 28 facing towards the rod-like extension 2. The protrusion 32 comprises, seen in cross-section, an enlarged head 34 connected to a base 35 via a restricted neck 36. In use, the enlarged head 34 faces towards the rod-like extension 2, and the base 35 faces towards the nozzle 28.

With reference to FIG. 8 and particularly the detail B shown therein, the rib-like protrusion 32 cooperates with a correspondingly shaped elongated groove 37 on the side wall 13 of the second part 4 of the connecting device 1.

As seen in FIGS. 9 and 10, the protrusion 32 is slid inside the groove 37, in one go, upon insertion of the free end of the rod-like extension 2 inside the channel 15 of the connecting device 1. The mutually cooperating protrusion/groove means 32,37 ensures that any movement of the nozzle 28 in a transversal direction (i.e. in a direction towards the windscreen to be wiped and in a direction away from the windscreen to be wiped, i.e. perpendicular to the windscreen to be wiped) is blocked. The rod-like extension 2 is locked inside the channel 15 in the longitudinal direction to ensure that any movement of the nozzle 28 is blocked in the longitudinal direction as well.

The invention is not restricted to the preferred embodiments shown in the figures, but extends also to other preferred variants within the scope of the appended claims.

The invention claimed is:

1. A flat blade windscreen wiper device adapted to support an elastic, elongated carrier element and an elongated wiper blade of a flexible material, adapted to be placed in abutment with a windscreen to be wiped, wherein the wiper blade includes at least one longitudinal slit, said windscreen wiper device comprising:

an oscillating arm having a rod-shaped extension;

a connecting device including a channel to receive a free end of said rod-shaped extension, said channel includes a first chamber facing towards an entrance of said channel, and a second chamber facing away from said entrance, said first chamber having a larger width than said second chamber, wherein said first chamber is arranged to receive a first part of said free end of said rod-shaped extension, and wherein said second chamber is arranged to receive a second part of said free end of said rod-shaped extension, wherein said first part of said rod-shaped extension has a larger width than said second part of said rod-shaped extension; and a nozzle for spraying a washing liquid onto the windscreen to be wiped, said nozzle adapted to be mounted onto said rod-shaped extension, wherein said nozzle and said connecting device are provided with mutually cooperating protrusion/groove means for locking said nozzle onto said connecting device upon insertion of said free end of said rod-shaped extension inside said channel of said connecting device.

2. The windscreen wiper device according to claim 1, wherein said nozzle extends parallel to said rod-shaped extension, and wherein said nozzle is locked onto said connecting device upon insertion of said free end of said rod-shaped extension, in a longitudinal direction of said rod-shaped extension, inside said channel of said connecting device.

3. The windscreen wiper device according to claim 1, wherein said connecting device comprises a first part pivotally connected to a second part about a pivot axis, wherein said rod-shaped extension of said oscillating arm can be pivotally connected to said first part about said pivot axis, with the interposition of said second part, wherein said second part comprises said channel, wherein said first part is adapted to be connected to the wiper blade and said second part is detachably connected to said first part, and wherein said second part is provided with said mutually cooperating protrusion/groove means.

4. The windscreen wiper device according to claim 3, wherein said second part comprises a groove, wherein said nozzle comprises a protrusion, and wherein said protrusion slides inside said groove upon insertion of said free end of said rod-shaped extension inside said channel of said connecting device.

5. The windscreen wiper device according to claim 4, wherein said groove and said protrusion are elongated and extend parallel to said rod-shaped extension.

6. The windscreen wiper device according to claim 4, wherein said protrusion extends from a side wall of said nozzle facing towards said rod-shaped extension.

7. The windscreen wiper device according to claim 6, wherein said protrusion comprises an enlarged head connected to a base via a restricted neck, wherein said enlarged head faces towards said rod-shaped extension, and wherein said base faces towards said nozzle.

8. The windscreen wiper device according to claim 3, wherein said connecting device comprises a sidewardly and inwardly extending protrusion arranged to engage into a first recess on a longitudinal exterior side of said rod-shaped extension, wherein said connecting device comprises a resilient tongue arranged to engage into a second recess on said longitudinal exterior side of said rod-shaped extension, and wherein said resilient tongue is hingeable along a hinge axis between an inward position adapted to retain the wiper blade onto said rod-shaped extension and an outward position adapted to release the wiper blade from said rod-shaped extension.

9. The windscreen wiper device according to claim 8, wherein when said rod-shaped extension is pivoted into a working position, said protrusion engages into said first recess thus adapted to retain the wiper blade onto said rod-shaped extension, and wherein said rod-shaped extension is pivoted into a service position, said protrusion disengages from said first recess thus adapted to release the wiper blade from said rod-shaped extension.

10. The windscreen wiper device according to claim 8, wherein said first and second recesses have an open circumference and are spaced-apart in longitudinal direction.

11. The windscreen wiper device according to claim 8, wherein said resilient tongue is hingeable from said inward position into said outward position by a push button, wherein said push button forms a part of an outer wall of said connecting device.

12. The windscreen wiper device according to claim 11, wherein said push button is located near a free end of said connecting device facing towards said rod-shaped extension.

13. The windscreen wiper device according to claim 8, wherein said first part and said second part are provided with mutually cooperating pivot means for pivotally connecting said second part to said first part.

14. The windscreen wiper device according to claim 13, wherein said second part is connected to said first part by pivotally engaging protuberances of said first part, at the location of said pivot axis, in recesses provided in said second part.

15. The windscreen wiper device according to claim 14, wherein said first part comprises a flat base having legs integral therewith adapted to engage around longitudinal sides of the wiper blade, at a location of the slit.

16. The windscreen wiper device according to claim 15, wherein said first part comprises two opposite side walls extending in upright direction from said base, and wherein one of said side walls comprises said sidewardly and inwardly extending protrusion.

17. The windscreen wiper device according to claim 16, wherein said pivotally engaging protuberances of said first part are provided outwardly on said opposite side walls, and wherein said recesses are provided inwardly in opposite walls of said second part.

18. The windscreen wiper device according to claim 13, wherein said second part is detachably connected to said first part through a snapping/clipping operation.

19. The windscreen wiper device according to claim 1, wherein said channel has a length and a width, and wherein a plane extending in a direction of said width of said channel enclose an angle $\alpha$, wherein preferably $15°<\alpha<60°$.

* * * * *